United States Patent Office 3,493,544
Patented Feb. 3, 1970

3,493,544
POLYESTERAMIDES
Isaac Goodman and Neville Robert Hurworth, Runcorn, England, assignors to Imperial Chemical Industries Limited, London, England, a corporation of Great Britain
No Drawing. Filed Mar. 15, 1967, Ser. No. 623,228
Claims priority, application Great Britain, Mar. 29, 1966, 13,861/66
Int. Cl. C08g 20/30
U.S. Cl. 260—78                                      6 Claims

ABSTRACT OF THE DISCLOSURE

Polyesteramides which are essentially polyamides of (i) at least one disecondary diamine in which at least one, and preferably both, of the amino nitrogen atoms form part of a heterocyclic group, and the amino groups are spaced from each other by at least two carbon atoms, with (ii) at least one dicarboxylic acid having the structure $HOOC(CH_2)_nCOOH$ (I) where $n$ is an integer of from 2 to 10, the said polyamides having incorporated into the macromolecular chain 6-oxycaproyl units, there being at least 5, but not more than 95, 6-oxycaproyl units for every 100 diamide plus 6-oxycaproyl units in the macromolecular chain, and having a reduced viscosity of at least 0.3 dl. gm.$^{-1}$, measured in m-cresol at 25° C.

---

This invention relates to polyesteramides.

We have found that high molecular weight polycondensation products comprising macromolecular chains containing residues of certain disecondary diamines, certain fatty dicarboxylic acids and ε-caprolactone are materials having combinations of physical properties which make them suitable for use in structural applications without further modification. They may be crystalline materials, convertible to films and fibres, which may be drawn, and convertible to other moulded objects which may make use of the strength of the materials or they may be amorphous elastomers.

According to the present invention we provide polyesteramides which are essentially polyamides of (i) at least one disecondary diamine in which at least one, and preferably both, of the amino nitrogen atoms form part of a heterocyclic group, and the amino groups are spaced from each other by at least two carbon atoms, with (ii) at least one dicarboxylic acid having the structure $$HOOC(CH_2)_nCOOH \qquad (I)$$

where $n$ is an integer of from 2 to 10, the said polyamides having incorporated into the macromolecular chain units of the structure (II) below:

$$—O—(CH_2)_5—CO— \qquad (II)$$

hereinafter referred to as 6-oxycaproyl units, there being at least 5, but not more than 95 6-oxycaproyl units for every 100 diamide plus 6-oxycaproyl units in the macromolecular chain, that is to say the ester units forming from 5% to 95% of the total number of ester units and diamide units in the macromolecular chains, and said polyamides having a reduced viscosity of at least 0.3 dl. gm.$^{-1}$, measured in a 5% solution in m-cresol at 25° C.

By the term diamide units, above and elsewhere in the specification and claims, we mean units of the structure:

$$—N{<}(R){>}N—CO—(CH_2)_n—CO—$$

wherein $—N{<}(R){>}N—$ represents the residue, after the removal of the two nitrogen-bonded hydrogen atoms, of a disecondary diamine as herein defined, and $$—CO—(CH_2)_n—CO—$$

represents the residue, after the removal of the two hydroxy groups, of a dicarboxylic acid as herein defined. Wherever proportions of units in the macromolecular chains are stated in the specification and claims, the figures given relate to these proportions that would be obtained assuming all the initial reactants are completely converted to the final product.

By a disecondary diamine we mean a compound which contains two secondary amino groups (—NH—), is free of primary amino groups (—NH$_2$) and in which all other nitrogen atoms, if any, are in the tertiary state, that is having no hydrogen atoms bound to them.

The polyesteramides according to the present invention may be prepared, for example, by modifying a process for producing a polyamide from one or more such disecondary diamines or polycondensable derivatives thereof and one or more such dicarboxylic acids or polycondensable derivatives thereof by the addition of a compound, hereinafter referred to as the ester-generating compound, capable of yielding 6-oxycaproyl units in the macromolecular chain, or by reacting the said ester-generating compound with one or more alkane dicarboxylate salts of said disecondary diamines, or by reacting the said ester-generating compound with the polyamide of at least one such disecondary diamine and at least one such dicarboxylic acid, the conditions being chosen to yield a product having a reduced viscosity of at least 0.3 dl. gm.$^{-1}$ measured in a 5% solution in m-cresol at 25° C.

Where the ester-generating compound is reacted with a polyamide, block copolymers, that is polyesteramides having substantial blocks of diamide units and blocks of 6-oxycaproyl units, as compared with more random arrangements of units, may, according to the reaction conditions employed, be formed. Such block copolymers may tend to have higher melting or softening points and less tractability than the normal, more random copolymers.

The ester-generating compound used in the preparation of the polyesteramides of the present invention is preferably ε-caprolactone. However, any other compound capable of yielding 6-oxycaproyl units may be used, and examples of such compounds include poly-ε-caprolactone, 6-hydroxycaproic acid, acyl, preferably acetyl, derivatives of 6-hydroxycaproic acid, and esters of 6-hydroxycaproic acid and its acyl derivatives, preferably those esters derived from alkyl alcohols having from 1 to 6 carbon atoms on account of availability and cost, for example methyl 6-hydroxycaproate, ethyl 6-hydroxycaproate, n-propyl 6-hydroxycaproate, n-butyl 6-hydroxycaproate, n-pentyl 6-hydroxycaproate and n-hexyl 6-hydroxycaproate.

Disecondary diamines that may be used in the preparation of the polyesteramides according to the present invention will be free of atoms or groups that would prevent successful polycondensation. The absence of active hydrogen atoms (other than those of the two secondary amino groups) is preferred where uncrosslinked products are desired. One or both of the secondary amino groups of the disecondary diamine will form part of a heterocyclic organic ring. Examples are piperazine and the isomeric bipiperidyls, particularly 4,4'-bipiperidyl. The diamide unit has the formulae

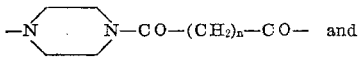 and

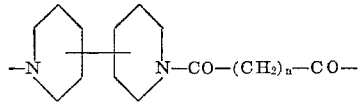

when the disecondary diamine is piperazine and a bipiperidyl respectively. Mixtures of the diamines may be used if desired.

The acids have the structure $HOOC—(CH_2)_n—COOH$ where $n$ is a whole number from 2 to 10, as in succinic, glutaric, adipic, pimelic, suberic, azelaic, sebacic, 1,9-nonanedicarboxylic, and 1,10-decanedicarboxylic acids. Our preferred acids are adipic and sebacic acids particularly adipic acid on account of the properties of the products therefrom. Mixtures of the dicarboxylic acids may be used if desired.

The properties of our polymers will depend upon the nature of the dicarboxylic acid, the nature of the disecondary diamine and the proportion of

units in the macromolecular chain, increase in which generally decreases the melting or softening point of the polymers. For example, those products comprising polyamides from piperazine and sebacic acid having 6-oxycaproyl units incorporated into the macromolecular chains, are crystalline over the whole range of proportions of 6-oxycaproyl units in the chain envisaged in our invention. Our preferred range of 6-oxycaproyl unit proportions for these products is from 5 to 70 6-oxycaproyl units for every 100 6-oxycaproyl plus diamide units in the macromolecular chain. On the other hand, those products comprising polyamides from piperazine and adipic acid having 6-oxycaproyl units incorporated in the macromolecular chain are unexpectedly amorphous and elastomeric when the 6-oxycaproyl units form from about 60% to about 85% of the total number of units in the macromolecular chain (our preferred range), whereas when the 6-oxycaproyl units form less than about 60% or more than about 85% of the total units in the macromolecular chain, the products become increasingly crystalline. Additionally, as the proportions of 6-oxycaproyl units decrease from 60% of the total number of units in the macromolecular chain, the products become more difficult to prepare.

A preferred process for the preparation of the polyesteramide of the present invention is to mix ε-caprolactone with at least one alkane dicarboxylate salt derived from a disecondary diamine as hereinbefore defined and a dicarboxylic acid as hereinbefore defined, and to heat the components together in an inert atmosphere at temperatures in the range 180° C. to 300° C. until a polymer having a reduced viscosity of at least 0.3 dl. gm.$^{-1}$, measured in a 5% solution in m-cresol at 25° C. is obtained. Polymers of such intrinsic viscosities may be obtained in known manner without resort to any special reaction conditions. Factors, known in the art, which generally effect molecular weight in polycondensation reactions include (i) the relative molar proportions of diamine and diacid, which should preferably be close to 1:1 to attain high molecular weights, (ii) the choice of reaction conditions, e.g. temperature, pressure and reaction time, to give a high degree of chemical conversion, and (iii) the purity of the starting materials and the presence or absence of monofunctional materials which may reduce the molecular weight of the products. Temperatures outside the range 180° C. to 300° C. may be used, if desired, although it may be found that below 180° C. the reaction rate becomes un-economically slow, or one or more of the initial reactants, particularly where a polyamide is one of the starting materials, remains in the solid state, and that above 300° C. the product tends to be degraded. It has been found convenient to effect the reaction in two stages, the first stage being to heat the reactants under an atmosphere of nitrogen until a homogeneous melt is obtained, and the second stage being to heat the homogeneous melt so obtained until a product of the desired intrinsic viscosity is obtained. The first stage may, if desired, be carried out at a lower temperature than the second stage. For example, temperatures of about 200° C. have been found convenient for the first stage, and temperatures of about 240° C. for the second stage. The second stage is preferably carried out under a rapidly flowing atmosphere of nitrogen to assist the removal of volatile reaction products and/or may be carried to the desired degree of conversion under reduced pressure.

If desired, the reaction may be carried out in solution in an inert, high-boiling solvent, for example diphenyl ether.

Catalysts or promoters for the reaction may be used in amounts of about 0.01% to 1%, for example, of the total weight of the reaction mixture. Suitable catalysts include, for example, p-toluene sulphonic acid, phosphoric acid, benzene sulphonic acid and sulphuric acid. The reaction time required will depend on several factors including the reaction components, the reaction conditions, and the degree of conversion desired. In general reaction times between 1 hr. and 50 hrs. have been found suitable. If necessary, the products may be isolated by conventional methods.

The above preferred reaction conditions are in general equally applicable to those reactions involving the preformed polyamide, or the disecondary diamine and the dicarboxylic acid.

The reaction mixture may also include other materials which are active under the polymerisation conditions. These may be monofunctional to control molecular weight or polyfunctional to cause modification and, in the case of a functionality in excess of two, to introduce cross-linking. Such compounds will generally contain one or more groups having an active hydrogen atom, for example —COOH, —OH, or >NH. Examples of such compounds are mono- and polyhydric alcohols, hydroxy acids, amino alcohols, amino acids and mono- and polyamines. The amino groups of the mono- and polyamines, amino alcohols and amino acids may be primary or secondary as desired. The introduction of primary amino groups may yield products in which macromolecular chains are held together by hydrogen bonding. These materials may be used in amounts to yield up to 10 units for every 100 units in the macromolecular chain.

Our polyesteramides as a class are characterised by the fact that they are solid under normal conditions and, because of their favourable combination of physical properties, may be used in structural applications without further modification. As has already been stated, their particular properties vary according to their components and the relative proportions of 6-oxycaproyl units therein, and their applications will vary accordingly. In general, they may be moulded, extruded, melt spun, melt cast, pressed or otherwise fabricated by conventional techniques to yield coatings, mouldings and other shaped products and also films and fibres, which, when derived from the crystalline products of our invention, may be drawn to improve their properties. Before shaping, the polymers may, if desired, be modified by the addition of other materials, for example heat and light stabilisers, lubricants, mould-release agents, pigments, dyes, fillers (for example chopped glass fibres, asbestos fibre, clay minerals, powdered glass, graphite, molybdenum disulphide and powdered metals and metal oxides) and may be blended with other polymers, natural or synthetic. In general for shaping processes our polymers preferably have reduced viscosities, measured in a 5% solution in m-cresol at 25° C. of from 0.35 to 2.0 decilitres gm.$^{-1}$. By reduced viscosity we mean the value obtained for the fraction.

$$\frac{t-t_0}{t_0 \cdot c}$$

(where $t$ is the flow time of a given volume of a solution of the polymer at a concentration of $c$ gms. decilitre$^{-1}$ in a solvent through a specified viscometer and $t_0$=flow time of a similar volume of the solvent through the same viscometer).

Our polyesteramides, particularly those which are elastomeric, may also be useful as adhesives for a wide variety of adherends including, for example Gristle rubber, black soling compound, polyester films, for example "Melinex" (registered trademark) polyester film, and unplasticised or plasticised vinyl chloride polymers and copolymers.

Many of the polyesteramides of our invention are soluble in a wide range of common organic solvents, in particular chloroform and ethanol, and may therefore be used in solution-based applications, for example for solution fabrication, for example to films and fibres, as solution adhesives, as solution coating compositions, and as solutions for aerosol spray.

The invention is illustrated but in no way limited by the following examples in which all proportions are in parts by weight unless otherwise indicated.

EXAMPLE 1

A copolymer in which 50 in every 100 units in the polymer chains are —O—(CH$_2$)$_5$—CO— units, the other 50 being 4,4'-bipiperidine-N,N'-diyl adipamide units was prepared by the reaction of ε-caprolactone (114 parts) with 4,4'-bipiperidyl (154 parts) and adipic acid (146 parts).

The reactants were melted together under an atmosphere of nitrogen, and maintained at a temperature of 200° C., rising to 240° C. for 1¼ hours. A rapid nitrogen flow was then established and the temperature maintained at 240° C. for a further 18 hours. At the end of this time the reaction was discontinued.

After cooling, a brown amorphous resin was obtained which softened over the range of 63° C. to 67° C. and then flowed. Moulded articles could be fabricated from the product.

A 0.5% by weight solution of the product in m-cresol had a reduced viscosity of 0.51 decilitre gm.$^{-1}$ at 25° C.

EXAMPLE 2

A copolymer in which 10 in every 100 units in the polymer chains are piperazine-N,N'-diyl adipamide units, the other 90 being —O—(CH$_2$)$_5$—CO— units was prepared by the reaction of ε-caprolactone (270 parts) with piperazylene diammonium adipate (61 parts).

The reactants were heated together under an atmosphere of nitrogen at 200° C. for 30 minutes at the end of which time a homogeneous melt was obtained. The temperature of the reaction was then increased to 240° C. and a rapid nitrogen flow established to aid the displacement of volatile reaction products. The reaction was discontinued after a further 21 hours under these conditions.

After cooling, a white crystalline solid was obtained, which melted over 49° C. to 53° C. A 0.5% by weight solution of the product in m-cresol at 25° C. had a reduced viscosity of 0.64 decilitre gm.$^{-1}$. Fibres could be drawn from a melt of the product.

EXAMPLE 3

A copolymer in which 15 in every 100 units in the polymer chains are piperazine-N,N'-diyl adipamide units, the other 85 being —O—(CH$_2$)$_5$—CO— units was prepared by the reaction of ε-caprolactone (432 parts) with piperazylene diammonium adipate (155 parts).

The reactants were heated together under nitrogen at 240° C. for 20 minutes to obtain a homogeneous melt. A rapid stream of nitrogen was then established to aid the displacement of volatile reaction products. The reaction was discontinued after a further 24 hours under these conditions.

After cooling, a solid elastomeric material was obtained which adhered to a heated metal (Kofler) bar at 74° C. A 0.5% by weight solution of the product in m-cersol at 25° C. had a reduced viscosity of 0.85 decilitre gm.$^{-1}$. Fibres could be drawn from a melt of the product.

EXAMPLE 4

A copolymer in which 80 in every 100 units in the polymer chains are —O—(CH$_2$)$_5$—CO— units, the other 20 being piperazine-N,N'-diyl adipamide units was prepared by the reaction of ε-caprolactone (378 parts) with piperazylene diammonium adipate (192 parts).

The reactants were melted together under nitrogen at 240° C. and maintained at this temperature under a rapid nitrogen flow for 24 hours.

After cooling, a faintly yellow, elastomeric solid was obtained which adhered to a heated (Kofler) bar at about 120° C. A 0.5% by weight solution of the product in m-cresol at 25° C. had a reduced viscosity of 0.87 decilitre gm.$^{-1}$.

Fibres could be readily drawn from a melt of the product.

The mechanical properties of a film moulded at 125° C. from the polymer were as follows:

Breaking stress _____dyne/cm.$^2$__ 6.0×10$^7$
Initial modulus _____dyne/cm.$^2$__ 5.8×10$^7$
Elongation at break _____percent__ 672

The above mechanical properties, and those quoted in the following examples were measured on a Type E Hounsfield tensile tester at a strain rate of 100%/minute using specimens having the British Standard dumb-bell shape, Type C, as specified in British Standard 903.

Good adhesion was observed between samples of a wide variety of adherends, the samples being bonded by interposing a film of the polymer between the two abutting surfaces, and applying such heat and pressure as was necessary to give good contact between the adhesive and the adherends. The following values were observed in peel tests for the named adherends:

Lbs./in.
Gristle rubber:Gristle rubber _____ 17.7
Black soling compound:black soling compound ____ 15.4
"Melinex" (registered trademark) polyester film:
 "Melinex" polyester film _____ 5.9

The peel tests used to obtain the above results, and those in the following example followed the procedure described in ASTM "Adhesives (T-Peel Test) D1876" except that cross-head speeds of 4.5 inches/minute were used.

EXAMPLE 5

A copolymer in which 70 in every 100 units in the polymer chains are 6-oxycaproyl units, the other 30 being piperazine-N,N'-diyl adipamide units was prepared by the reaction of ε-caprolactone (324 parts) with piperazylene diammonium adipate (283 parts) using the same conditions as described in Example 4.

After cooling, a slightly yellow, tough, elastomeric solid was obtained which adhered to a heated metal (Kofler) bar at about 160° C. A 0.5% by weight solution of the product in m-cresol at 25° C. had a reduced viscosity of 0.70 decilitre gm.$^{-1}$.

Fibres could easily be drawn from a melt of the product.

The mechanical properties of a film moulded from the produced at 175° C. were as follows:

Breaking stress _____dyne/cm.$^2$__ 7.7×10$^7$
Initial modulus _____dyne/cm.$^2$__ 2.5×10$^7$
Elongation at break _____percent__ 177

Good adhesion was observed to a wide variety of adherends, the following values being observed in peel tests on the named adherends:

| | Lbs./in. |
|---|---|
| Gristle rubber:Gristle rubber | 13.7 |
| Black soling compound:black soling compound | 11.6 |
| "Melinex" (registered trademark) polyester film: "Melinex" polyester film | 3.2 |

EXAMPLE 6

A solid, tough, elastomeric polyesteramide was prepared as described in Example 5. The product had a Vicat softening point of 176° C. to 184° C. and a reduced viscosity, as a 0.5% by weight solution in m-cresol at 25° C. of 0.65 decilitre gm.$^{-1}$.

A fibre was spun from a melt of the product at 210° C. Part of the resultant yarn was drawn on a small draw frame at a ratio of 4.0x, and samples of the drawn and undrawn yarn were relaxed in steam at a pressure of 2 lbs. per sq. in. for 15 minutes, and then conditioned overnight at a relative humidity of 65% and a temperature of 70° F. Samples of the drawn and undrawn yarn were then subjected to the following tests.

The deniers of the drawn and undrawn yarn were determined by weighing 20 cm. samples on a torsion balance. The tenacity, extension at break and initial modulus at 100% extension were then measured on 5 samples each of the drawn and undrawn yarn, the measurement being carried out on 5 cm. test lengths on an Instron tensile tester at a rate of extension of 1,000% per minute.

The elastic recovery and work recovery from 100% extension were then determined on 5 samples each of the drawn and undrawn yarn. 10 cm. test lengths were tested on an Instron tensile tester at a rate of extension of 500% per minute, each sample being cycled four times from 0% to 100% extension, the measurements taken being the average values for the second, third and fourth cycles.

10 cm. test lengths of 3 samples each of the drawn and undrawn yarn were then mounted on an Instron tensile tester and cycled once from 0% to 100% to 0% extension, at a rate of extension of 500% per minute as a conditioning cycle. The samples were then extended to 100% extension, and maintained at this extension for 15 minutes. At the end of this time the stress $$\text{decay}\left(=\frac{\text{decrease in load}}{\text{original load}}\times 100\%\right)$$

and the elastic recovery were measured.

The average results of the above tests are given below:

| | Undrawn yarn | Drawn yarn [1] |
|---|---|---|
| Tenacity (gm./denier) | 0.14 | 0.12 |
| Extension at break, percent | 413 | 270 |
| Initial modulus at 100% extension (gm./denier) | 0.07 | 0.06 |
| Elastic recovery from 100% extension, percent | 94.2 | 93.3 |
| Work recovery from 100% extension, percent | 78.5 | 79.5 |
| Stress relaxation: | | |
| Stress decay, percent | 41.5 | 41.9 |
| Elastic recovery, percent | 68.1 | 68.3 |

[1] Drawn to a draw ratio of 4.0x.

EXAMPLE 7

A copolymer in which 60 in every 100 units in the polymer chains are —O—(CH$_2$)$_5$—CO— units, the other 40 being piperazine-N,N'-diyl sebacamide units was prepared by the reaction of ε-caprolactone (108 parts) with piperazylene diammonium sebacate (182 parts).

The reactants were melted together under nitrogen at 200° C. and maintained at this temperature for 30 minutes. The temperature was then increased to 240° C. and a rapid nitrogen flow was established. The reaction was discontinued after a further 26 hours.

After cooling, a white, crystalline solid was obtained, melting over the range 97° C. to 101° C. and having a reduced viscosity, as a 0.5% by weight solution in m-cresol at 25° C. of 0.69 decilitre gm.$^{-1}$.

Fibres could be drawn from a melt of the product.

EXAMPLE 8

A copolymer having an equal number of $$—O—(CH_2)_5—CO—$$

units and piperazine-N,N'-diyl sebacamide units in the polymer chains was prepared by the reaction of ε-caprolactone (972 parts) and piperazylene diammonium sebacate (2450 parts). 50 parts of p-toluene sulphonic acid were added as a catalyst.

The reactants were melted together under nitrogen at 200° C. and maintained at this temperature for 30 minutes. The temperature was then increased to 240° C. and a rapid nitrogen flow established to aid the removal of volatile reaction products. The reaction was discontinued after after a further 24 hours.

After cooling, a solid crystalline material was obtained, melting at 103° C. and having a reduced viscosity, as a 0.5% by weight solution in m-cresol at 25° C. of 0.90 decilitre gm.$^{-1}$.

Fibres spun from a melt of the product could be cold drawn to a ratio of 3:1.

The polymer was moulded at 110° C. to a flexible film having the following properties:

| | | |
|---|---|---|
| Breaking stress | dyne/cm.$^2$ | $1.0\times10^8$ |
| Initial modulus | dyne/cm.$^2$ | $1.6\times10^9$ |
| Elongation at break | percent | 188 |

EXAMPLES 9–13

Further crystalline polyesteramides, having varying ratios of —O—(CH$_2$)$_5$—CO— units to piperazine-N,N'-diyl sebacamide units were prepared by the reaction of ε-caprolactone with piperazylene diammonium sebacate.

In each case, the mixed reactants were heated to 200° C. under nitrogen for 30 minutes to produce a homogeneous melt. A rapid flow of nitrogen was then established and the temperature of the reaction mixture was raised to 240° C. The reaction mixtures were maintained at this temperature for varying lengths of time.

The accompanying table shows the molar proportions of —O—(CH$_2$)$_5$—CO— units to piperazine-N,N'-diyl sebacamide units in the starting mixtures, the reaction times at 240° C. and the melting ranges and reduced viscosities of the products. Fibres and films could be fabricated from the products.

| Ex. No. | -O-(CH$_2$)$_5$-CO- units, mole, percent | Piperazine N,N'-diyl units, mole, percent | ε-Caprolactone parts | Piperazylene diammonium sebacate, parts | Reaction time at 240° C., hours | Melting range of product, ° C. | Reduced viscosity of product, as a 0.5% by wt. solution in m-cresol at 25° C. decilitre, gm.$^{-1}$ |
|---|---|---|---|---|---|---|---|
| 9 | 90 | 10 | 270 | 76 | 20 | 52–57 | 0.74 |
| 10 | 80 | 20 | 216 | 136 | 20 | 56–61 | 0.72 |
| 11 | 70 | 30 | 162 | 180 | 26 | 69–72 | 0.78 |
| 12 | 40 | 60 | 54 | 205 | 26 | 115–118 | 0.65 |
| 13 | 20 | 80 | 151 | 1500 | 24 | 150–154 | 0.84 |

What is claimed is:

1. A polyesteramide having a reduced viscosity of at least 0.3 dl. gm.$^{-1}$ measured in a 5% solution in m-cresol at 25° C. and consisting essentially of
   (i) ester units having the structure $$-O-(CH_2)_5-CO-$$

and
   (ii) diamide units selected from the group consisting of those having the structures

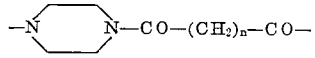

and

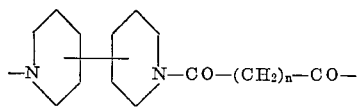

where $n$ is a whole number of from 2 to 10, the ester units forming from 5% to 95% of the total number of ester units and diamide units in the macromolecular chains.

2. A polyesteramide according to claim 1 in which the diamide units have the structure

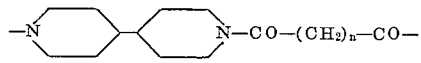

3. A polyesteramide according to claim 1 in which $n$ is selected from the group consisting of 4 to 8.

4. An amorphous and elastomeric polyesteramide according to claim 1 in which the diamide units have the structure

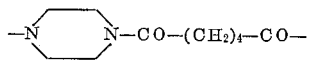

and in which the ester units form from 60% to 85% of the total number of ester units and diamide units in the macromolecular chains.

5. A fiber of a polyesteramide according to claim 1.
6. A film of a polyesteramide according to claim 1.

References Cited

UNITED STATES PATENTS

| | | | |
|---|---|---|---|
| 2,071,251 | 2/1937 | Carothers | 260—78 |
| 2,238,640 | 4/1941 | Hanford | 260—78 |
| 2,547,113 | 4/1951 | Drewitt et al. | 260—78 |
| 3,162,619 | 12/1964 | Lang et al. | 260—78 |

HAROLD D. ANDERSON, Primary Examiner

U.S. Cl. X.R.

260—3, 33.8, 33.4, 37, 76, 77, 857, 24; 117—161; 161—227; 264—210